United States Patent
Higurashi et al.

(10) Patent No.: US 6,995,790 B2
(45) Date of Patent: *Feb. 7, 2006

(54) IMAGE PROCESSING APPARATUS FOR JOINING A PLURALITY OF IMAGES

(75) Inventors: Masaki Higurashi, Hino (JP);
Yasuhiro Komiya, Hachioji (JP);
GangLu Jing, Hachioji (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 149 days.

(21) Appl. No.: 08/964,180

(22) Filed: Nov. 4, 1997

(65) Prior Publication Data

US 2003/0133019 A1    Jul. 17, 2003

(30) Foreign Application Priority Data

Nov. 8, 1996  (JP) ................................. 8-296750
Nov. 22, 1996  (JP) ................................. 8-312260

(51) Int. Cl.
 H04N 5/225  (2006.01)
 H04N 5/228  (2006.01)
 H04N 5/235  (2006.01)

(52) U.S. Cl. ............................... 348/218.1; 348/222.1; 348/362

(58) Field of Classification Search ................. 348/218, 348/229, 230, 335, 340, 222, 218.1, 229.1, 348/230.1, 222.1; 358/443; H04N 5/225
See application file for complete search history.

(56) References Cited

U.S. PATENT DOCUMENTS

| | | | |
|---|---|---|---|
| 4,926,247 A | | 5/1990 | Nagasaki et al. |
| 5,276,519 A | * | 1/1994 | Richards et al. ............ 348/335 |
| 5,646,679 A | * | 7/1997 | Yano et al. ................. 348/218 |
| 5,818,527 A | * | 10/1998 | Yamaguchi et al. ........ 348/335 |
| 5,828,793 A | * | 10/1998 | Mann .......................... 348/222 |
| 6,097,430 A | * | 8/2000 | Komiya et al. ............. 348/218 |

FOREIGN PATENT DOCUMENTS

| | | | |
|---|---|---|---|
| JP | 63-232591 | | 9/1988 |
| JP | 6-141228 | | 5/1994 |
| JP | 8-32847 | * | 2/1996 |
| JP | 6-141246 | | 5/1996 |
| JP | 8-116490 | | 5/1996 |

* cited by examiner

*Primary Examiner*—Thai Tran
*Assistant Examiner*—Luong T. Nguyen
(74) *Attorney, Agent, or Firm*—Frishauf, Holtz, Goodman & Chick, P.C.

(57) ABSTRACT

In an image processing apparatus of the present invention, which displays image data, such as images photographed by imaging apparatus such as a digital camera and photographing conditions as images before correction and images after correction, on an image display section, distortion and color tone of images obtained from an unused camera are corrected and joined to each other as viewing images before and after correction, so that the parameters used in the correction are stored in accordance with its apparatus, and the stored parameters are read out and used to correct in images obtained from previously used camera, and the joined image and image data are displayed on a monitor and output by a printer, or stored in a recording medium.

12 Claims, 9 Drawing Sheets

| NAME OF MENU | A1 | A2 |
|---|---|---|
| CAMERA A | −0.030 | +0.150 |
| CAMERA B | −0.002 | −0.010 |
| ⋮ | ⋮ | ⋮ |

IMAGE PROCESSING APPARATUS FOR JOINING A PLURALITY OF IMAGES

BACKGROUND OF THE INVENTION

The present invention relates to an image processing apparatus for joining (restoring composition) a plurality of images taken to which one composition is divided with an overlap area where desired object exists or synthesizing a plurality of images taken with a different exposure, and more particularly to an image processing apparatus for extending a viewing angle of a joined image and its dynamic range of a synthesized image.

In recent years, personal computers (hereinafter called PC) got much more capability and their price is reducing in accordance with improvement of manufacture technique, so that they have been widely used in many companies, education, and home.

To input images to PC, an image is optically picked up from a film photographed by a conventional camera and is converted to an image signal to be input.

In addition to camera, imaging apparatus such as a video camera for taking the image are used in various situations. Particularly, in a digital still camera, a film, which is used in the general camera, doesn't have to be, used. Instead, the image is converted to a digital signal and recorded in storage medium, which is magnetically or optically recordable, so that the digital signal is input to the inputting device. Then, the image is reconstructed to be output to a display or a printer. As a result, developing process for films is unnecessary, and erasing and editing can be easily performed.

Moreover, demand for digital still cameras has been rapidly increased for the purpose of using the Internet communication in accordance with an increase Internet users, reduce the price of the digital still camera.

The digital still camera get a image of the object as an image signal by a solid state imaging device, such as CCD, using photoelectric conversion. However, since resolution and a dynamic range are low as compared with the ordinary film, the technique to make high resolution images and to extend a dynamic range of images have been strongly desired.

One of methods for obtaining high resolution image is increasing the number of pixels of the imaging device itself. However, it is generally known that the cost of the imaging device rapidly rises with the increase in the number of pixels.

The applicant of the present application proposed the technique of joining the images taken by a plurality of imaging devices or images obtained by moving a camera as described in Japanese Patent Application KOKAI Publication No. 6-141246.

However, in general when the photographed image is subjected to influence of distortion due to the optical system, the image is distorted. If the images are joined by the technique of Japanese Patent Application KOKAI Publication No. 6-141246, the composition of the overlapped parts differs between the images, and there occurs a problem object is seen double in the join image. Also, due to the displacement of the points, serving as a reference for joining, the image is detected as if it were rotated though the image is not actually rotated. As a result, there occurs a problem in which the images are not joined well.

To solve the above problems, the applicant of the present application proposed an image processing apparatus for compensating for influence of distortion comprising image correcting means for a geometrical correction as described in U.S. patent application Ser. No. 08/541,644 (filing data: Oct. 10, 1995).

Figure 18:
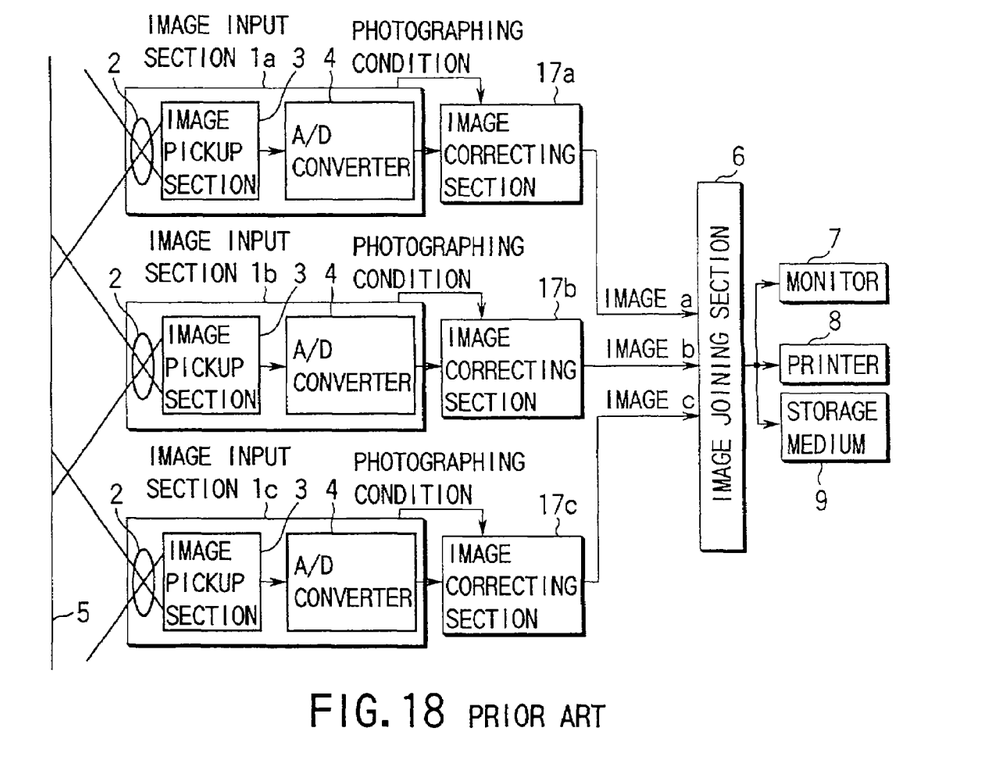
FIG. 18 is a view showing an example of the structure of a conventional image processing device.

The structure of the image processing apparatus is shown in FIG. 18.

In the figure, each of image input sections 1a to 1c of the image processing apparatus comprises an optical system 2, an image pickup section 3 such as CCD, and an A/D converter 4. These image input sections are arranged to Capture different portions (positions) of an object 5 to have the overlapping area.

An output signal of each image pickup section 3 is digitized by the A/D converter 4 so as to be input to each of image correcting sections 17a to 17c. Each of the image correcting sections 17a to 17c reads photographing conditions such as a focus position when a image is taken and a characteristic parameter of the optical system so as to correct the distortion of the images taken by the image input sections 1a to 1c.

Figure 20:
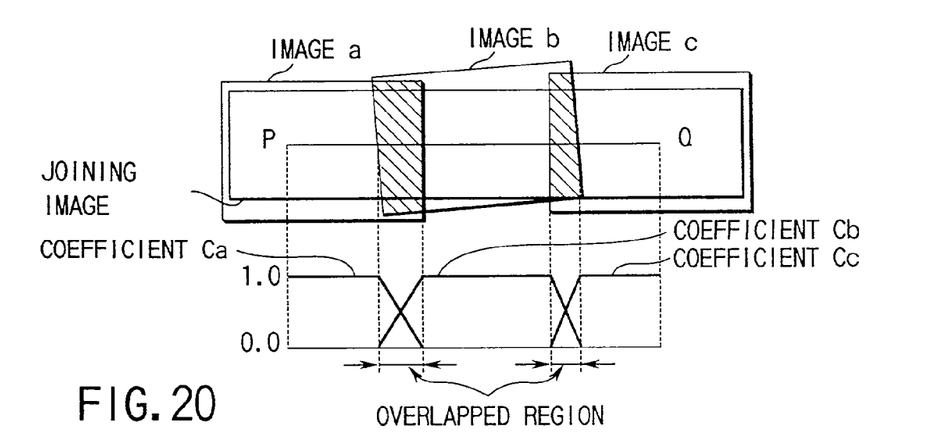
FIG. 20 is a view showing an overlapping state of images at a wide angle image joining time to connect the images.

Next, in an image joining section 6, the images (serving as input signals), which are corrected by the image correcting sections 17a to 17c, are joined to be a wide-angle image as shown in FIG. 20. Then, the joined image is output to a monitor 7, a printer 8 or a storage medium 9.

Figure 19:
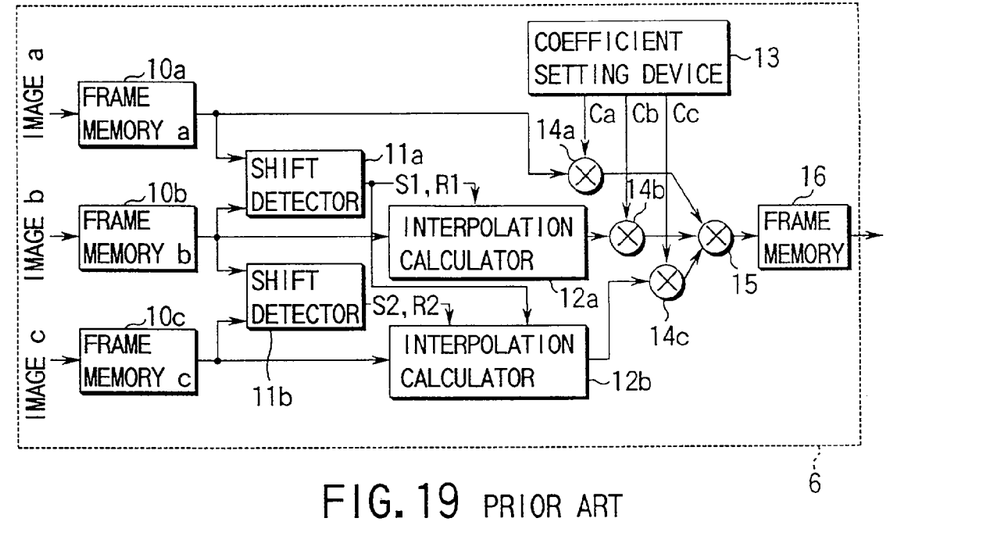
FIG. 19 is a view showing an example of the structure of an image joining section of FIG. 18.

The image joining section 6 is realized by the structure as shown in FIG. 19.

In this structure, the images a, b, and c are temporarily stored in a frame memory 10 respectively. Then, an amount of parallel movement S1 and an amount of rotations R1 between the adjacent images (e.g., images a and b) are obtained by a shift detector 11a. Similarly, an amount of parallel movement S2 and an amount of rotations R2 between the images b and c are obtained by a shift detector 11b.

These amounts of parallel movement S1, S2, and amounts of rotations R1 and R2 are input to interpolation calculators 12a and 12b, together with the images read from frame memories 10b, 10c. Thereby, the images whose positional relationship are corrected can be obtained.

A coefficient setting device 13 sets coefficients Ca, Cb, and Cc of the respective images of FIG. 20 such that the adjacent images are smoothly joined to each other. The pixel value of each image is multiplied by each of coefficients Ca, Cb, Cc by a multiplier 14. Then, the overlapping portion is added by an adder 15.

FIG. 20 is a view showing the processing of the overlapping portion of the images to be joined.

The image b rotates anticlockwise against the image a. The rotation of the image b and the amount of overlapping (or amount of parallel movement) are calculated by the shift detector 11. Also, as shown in FIG. 20, the pixel value of each image is multiplied by each of coefficients Ca, Cb, Cc so as to smoothly connect the images a and b, which are overlapped with each other. In this way, the image joining section 6 outputs the image in which the plurality of images are joined with high resolution or a wide viewing angle are provided.

Regarding to extend dynamic range of the imaging device, the applicant of the present application proposed the following technique in Japanese Patent Application KOKAI Publication No. 63-232591.

Specifically, a plurality of images photographed with different exposure is synthesized so as to generate an image having a dynamic range, which is almost equal to the film.

Figure 22:
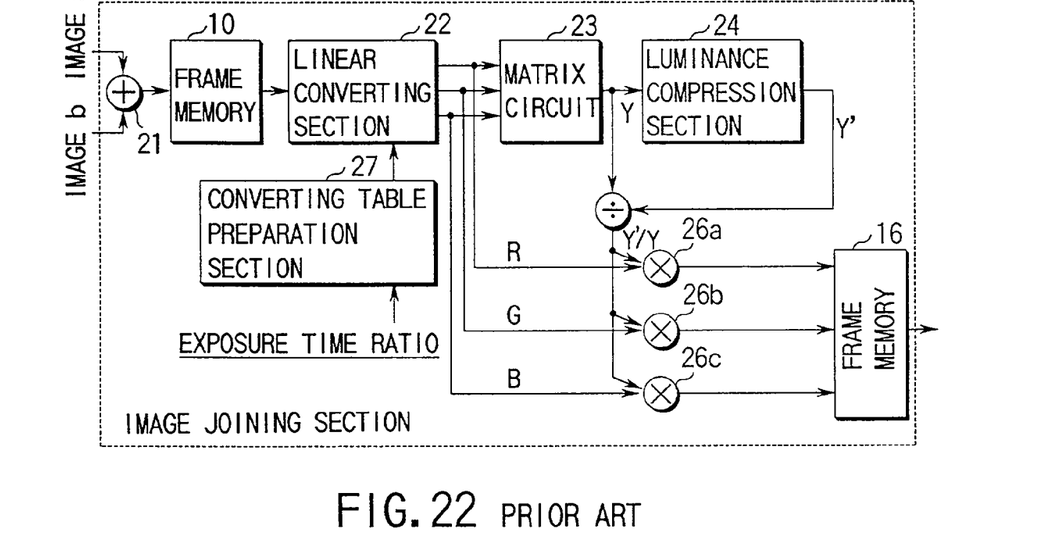
FIG. 22 is a view showing one example of the structure of the image joining section of FIG. 18.

The above technique can be realized by structuring the image joining section 6 as shown in FIG. 22.

FIG. 22 conceptually explains an example in which two images are synthesized. Even in a case of joining three or more images, the images are synthesized by the same process.

Two images a and b are added to each other at an adder 21 to be stored in the frame memory 10. A linear converting section 22 reads out data of the frame memory 10. The linear converting section 22 calculates values corresponding to R, G, B values of incident light based on a look-up table so as to be input to a matrix circuit 23. The R, G, B values obtained at this time exceed the dynamic range of an input device such as a digital still camera.

The converting table is determined from an exposure ratio, Rexp, of two images by a converting table preparation section. In the matrix circuit 23, a luminance signal value Y is obtained from R, G, B values. A luminance compression section 24 outputs a luminance value Y' which is compressed to adjust to the output device. Then, a ratio of compressed signal to original one Y'/Y is obtained by a divider 25. The ratio Y'/Y is multiplied by outputs R, G, B of the linear converting section 22 by a multiplier 25 so as to be stored in the frame memory 16 as a joining image result.

Figure 21:
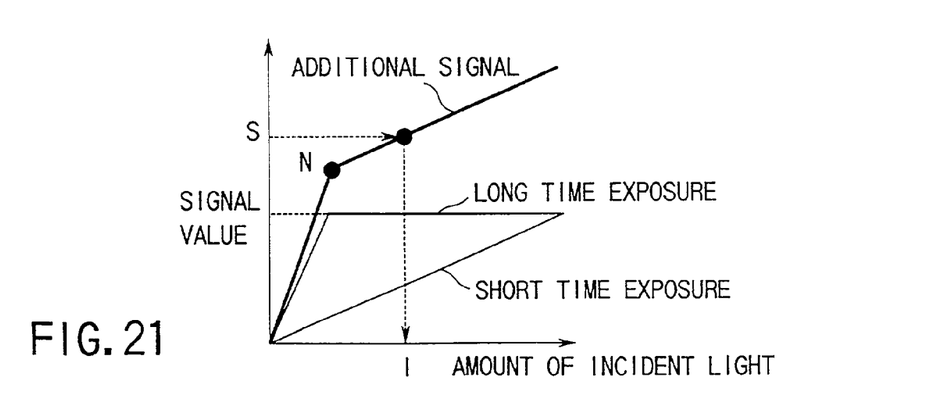
FIG. 21 is a view showing a characteristic of a signal obtained by adding a signal at long time exposure to a signal at short time exposure.

Generally, the signal value to be output from the imaging device is saturated for a certain amount of incident light in the case of longer time exposure as shown in FIG. 21.

The value of an additional signal in which the signal of the longer exposure and that of the shorter exposure are added is changed with respect to the amount of incident light as shown by a bent line showing as an additional signal in FIG. 21. Then, a converting table preparation section 27 determines a table in which an amount of incident light I is estimated from an additional signal value S.

Generally, since the image value is expressed by 256 steps of 0 to 255, luminance Y of each pixel is compressed, for example by the following equation (1):

$$Y' = b \cdot y^a \tag{1}$$

where a is a coefficient for determining a shape of compression and b is a coefficient for determining a gain of the entire image.

If two different exposure images are synthesized to each other by the above-mentioned method, there can be obtained an image having the dynamic range almost equal to the film and can be seen well from a dark part to a bright part.

However, in the conventional technique described in U.S. patent application Ser. No. 08/541,644, photographing conditions, which are necessary for correcting distortion, and the parameter of the optical system have to be set in advance. Due to this, it is difficult to get the image having high resolution image or a wide viewing angle image and a panorama image by simply using an arbitrary photographing device which the user has.

Figure 23A:
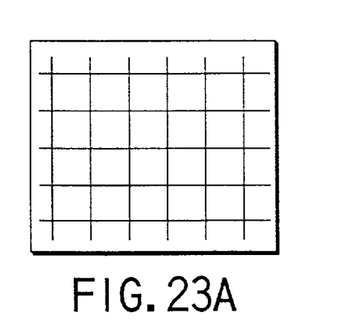
FIG. 23A is a view showing an image having no curve.
Figure 23B:
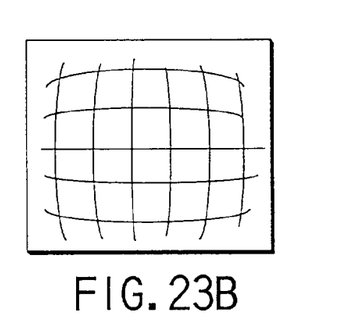
FIG. 23B is a view showing an image having distortion.
Figure 23C:
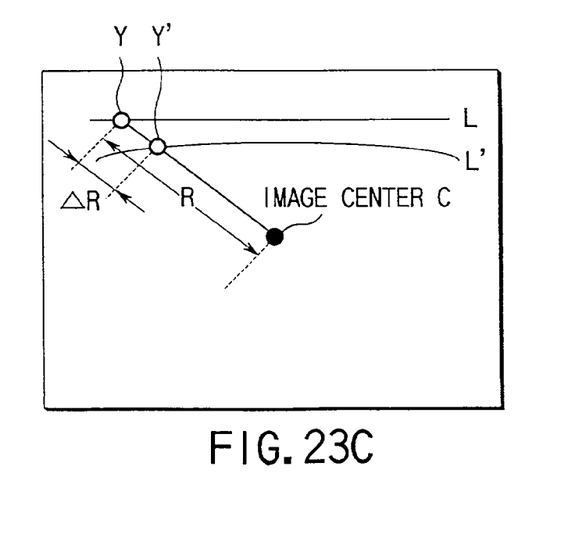
FIG. 23C is a view showing a characteristic of the distortion.

The following will explain about the distortion with reference to FIGS. 23A, 23B, and 23C.

More specifically, the distortion is generally a geometrical deformation, which is caused in accordance with the distance from the center of a lens. If the lattice object is photographed through the optical system without distortion, the image, which is shown in FIG. 23A, can be obtained. However, if the optical system suffered from distortion, the structure, which should be photographed by straight lines, are curved as shown in FIG. 23B. Thus, if the optical system has distortion, a straight line L is curved and captured as a curved line L' (FIG. 23C). As a result, a point Y on the straight line L is moved to a point Y' on the curved line L'.

In this case, an amount of distortion $\Delta R$ at one point on the image can be expressed by a polynomial expression (2):

$$\Delta R = A1 \cdot R^3 + A2 \cdot R^5 + \tag{2}$$

where R is a distance between a center of the image and the point Y.

To get the image whose distortion is corrected, point Y' may be moved by only an amount of distortion $\Delta R$ on the straight line connecting the center C of the image to point Y'. However coefficients A1, A2, . . . differ depending on the focal position of the optical system, it is difficult for the general user to know coefficients A1, A2, . . . correctly.

Also, coefficients A1, A2, . . . differ depending on the apparatus to be used. Due to this, when the different apparatus is used, the correction coefficient must be adjusted again.

Moreover, if images are taken by different zooming ratio, the size between adjacent images differs. Due to this, the images cannot be correctly joined to each other though the images are overlapped with each other. Also, for the object close to the user in such a case of an indoor place, the size is changed even if a photographer moves a few steps.

Moreover, there is a case in which a white balance is automatically adjusted. For example, the color tone differs depending on a case in which the object is photographed in a direction toward or away from the sun.

Due to this, when the images are joined by the above-mentioned technique, color is smoothly changed but the entire image seems unnatural one. Moreover, in the technique of the wide dynamic range, the table for estimating the amount of incident light from the additional signal must be prepared as explained in the prior art. However, as shown in FIG. 21, a point N where the inclination of the additional signal is changed varies depending on the exposure ratio Rexp. For this reason, the user must know the exposure ratio Rexp of the plurality of images to be synthesized in advance. However, in many cases, the digital still cameras on the market have the structure in which the exposure can be adjusted but the user cannot know the ratio exactly.

BRIEF SUMMARY OF THE INVENTION

An object of the present invention is to provide an image processing apparatus which can correct images and be joined by a simple operation based on images themselves without knowing coefficients such as distortion of a camera, and an image processing apparatus which can effectively synthesize an image of a wide dynamic range image from only images.

To achieved the above object, there is provided an image processing apparatus comprising:

image input means for dividing one composition to have an overlap area where the same object as each other exists at a joining position to be input as a plurality of image parts;

correction parameter setting means for setting a correction parameter necessary to correct at least distortion of the plurality of image parts generated in each overlap area or a difference between the image parts;

image correcting means for correcting at least one image part of the plurality of image parts in accordance with the set correction parameter to eliminate at least distortion of the plurality of image parts generated in each overlap area or the difference between the image parts;

image joining means for sequentially joining the plurality of image parts corrected by the image correction means in the overlap area to restore the one composition; and image display means for displaying the plurality of image parts input by the image input means, or at least one image part of the image parts corrected by the image correction means, or the restored image.

According to the above-structured image processing device, since the image corrected by image correction means can be displayed on the display means to be confirmed, the image can be effectively corrected without knowing the necessary correction parameter, and an image correctly jointed by image joining means can be obtained.

Also, according to the present invention, there is provided an image processing device comprising:

image input means for inputting one composition as a plurality of images photographed at a different exposure;

correction parameter setting means for setting a correction parameter necessary to correct brightness of at least one image of the plurality of images having a different exposure;

brightness correction means for correcting brightness of at least one image of the plurality of images in accordance with the set correction parameter;

image display means for displaying at least one image of the images corrected by the brightness correction means; and joining means for estimating an amount of incident light obtained when the one input image is input based on the plurality of input images and the set correction parameter to convert the plurality of images whose brightness is corrected by the brightness correction means to be placed in a displaying range of the image display means, thereby joining the plurality of images.

According to the above-structured image processing device, the images corrected by the image correction means are displayed on the image display means to set a correction parameter, the images whose brightness is corrected by the image joining means to be placed in the displaying range of the image display means based on the correction parameter.

The image processing device comprises correction parameter storing means for storing the correction parameters used in correcting the image in connection with names of corrected images or photographing devices and discrimination names of photographing methods. The correction parameter storing means selects a predetermined correction parameter from the correction parameters stored in the correction parameter storing means to be set.

Moreover, the image processing device stores the parameter value once used in the correction in the correction parameter storing means, and the necessary value is selected from the correction parameter storing means. As a result, there is no need of newly correcting the parameter every image from the beginning.

DETAILED DESCRIPTION OF THE PREFERRED EMBODIMENT

Embodiments of the present invention will now be specifically described with reference to the accompanying drawings.

Figure 1:
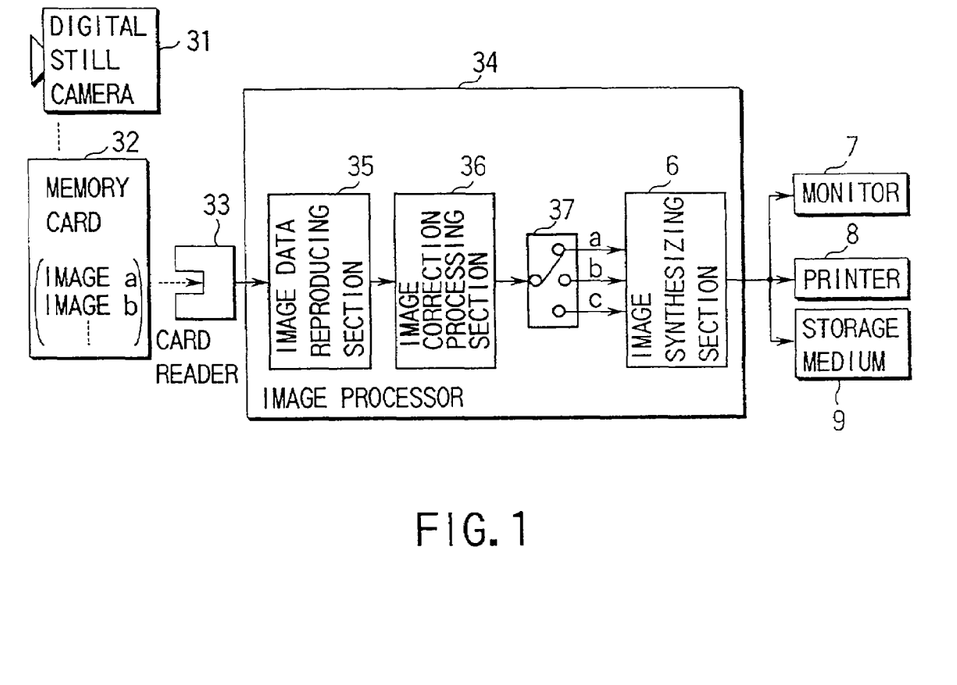
FIG. 1 is a view showing a schematic structure of an image processing device according to a first embodiment of the present invention.

FIG. 1 shows a schematic structure of an image processing apparatus according to a first embodiment of the present invention. This embodiment shows an apparatus for easily correcting distortion as viewing the display or so to synthesize the corrected images, thereby obtaining an image of high resolution and a wide angle image.

The image processing apparatus of this embodiment comprises a memory card 32, a card reader 33, an image processing section 34, a monitor 7, a printer 8 for a print output, and a storage device 9 such as an optical disk storing images, or a memory card.

The memory card 32 records image data taken by a digital still camera 31 and a photographing condition data when the image was taken. The card reader 33 reads out image data from the memory card 32. The image processing section 34 reproduces images from those image data, and provides correcting process such as distortion and a white balance to images to be joined. The monitor 7 displays the joined image and original image data.

The image processing section 34 comprises an image data reproducing section 35, an image correction processing section 36, a signal switching section 37, and an image joining section 6.

The image data reproducing section 35 provides a processing such as a decompression to image data read by the card reader 33, and reproduces the images and photographing condition data. The image correction processing section 36 provides correcting process such as distortion and a color tone to the images. The signal switching section 37 executes an image switching for joining the images.

Using the apparatus of the above-mentioned structure, a user takes an image to be divided such that parts of an object image are overlapped with each other. In other words, one composition is divided to a plurality of image pieces to be taken such that the same object are captured at the end portion.

Processing such as compression, addition of header data is provided to these photographed images (image a, image b, . . . ) in the digital still camera 31. Thereafter, these images are recorded to the memory card 32 as image data.

The memory card 32 is inserted to the card reader 33, and recorded image data is read out from the memory card 32 to be fetched to the image processing section 34. Fetched image data is input to the image data reproducing section 35, and processing such as decompression is provided thereto so that image data is reproduced. Then, the image correction processing section 36 provides a correcting process, and corrected image data is input to the image joining section 6. The image joining section 6 has the structure as shown in FIG. 19. The image joining section 6 provides the same processing as described in U.S. patent application Ser. No. 08/045,038 to join the images. The joined image is output to the monitor 7, the printer 8, or the storage medium 9.

Figure 2:
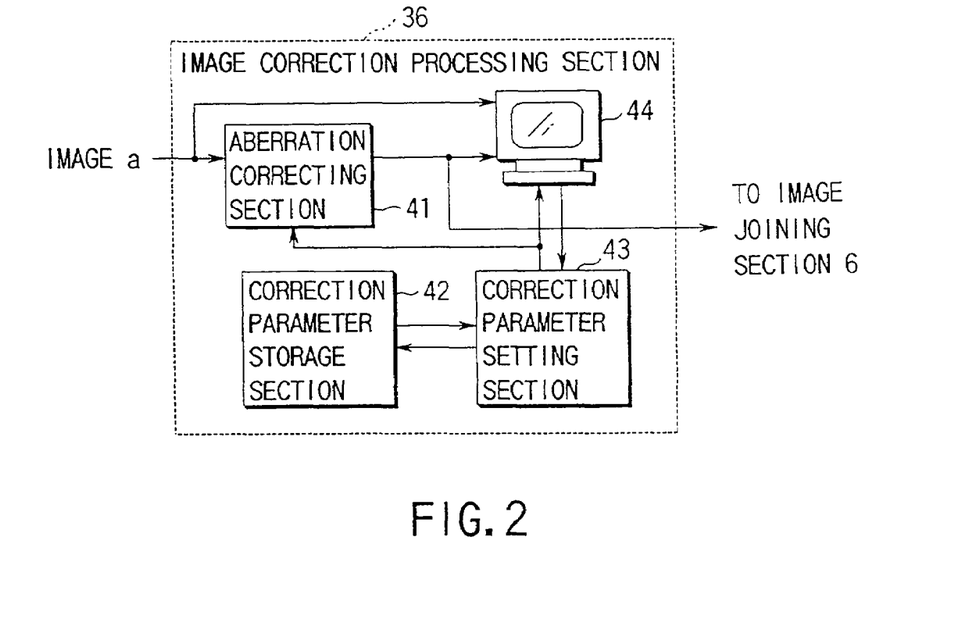
FIG. 2 is a view showing a specific structure of an image correction processing section of FIG. 1.

FIG. 2 explains the specific structure of the image correction processing section 36.

The image correction processing section 36 comprises an image display section 44, a distortion correction processing section 41, a correction parameter storage section 42, and a correction parameter setting section 43.

The image display section 44 displays an original image and a corrected image. The distortion correction processing section 41 provides a distortion to the input image. The correction parameter storage section 42 stores the parameter, which is used in the correcting process due to the distortion correction processing section 41. The correction parameter setting section 43 adjusts the correction parameter to be set by the user's operation. Or, the correction parameter setting section 43 selects the correction parameter read out from the correction parameter storage section 42 to be set.

The image correction processing section 36 differently works depending on the case. There are two cases, one case is that a distortion correction is provided to images taken by a certain camera in which distortion correction is never provided to its images, which is used for the first time. The other case is that the correction is provided to images taken with a camera in which distortion correction has been already provided to its images and correction history has been left.

First, the following will explain the case in which the distortion correction has not been provided to the images taken by a camera.

A distored image is inputted to the distortion correction processing section 41 as shown in FIG. 23B. Then, the distortion correction processing section 41 outputs the image corrected based on equation (2) to the image display section 44 by use of an initial value, set in advance, of coefficients A1, A2, . . . in equation (2). The image display section 44 simultaneously displays the corrected image and an original image a.

Then, when a desired coefficient is set by the user's operation, the correction parameter setting section 43, which comprises a mechanism for adjusting coefficients A1, A2, . . . , feeds back new coefficients A1, A2, . . . to the distortion correction processing section 41 to renew the coefficients immediately. The distortion correction processing section 41 outputs the image corrected by the new coefficient set, and the image display section 44 changes the displayed image to an image newly corrected.

Figure 3A:
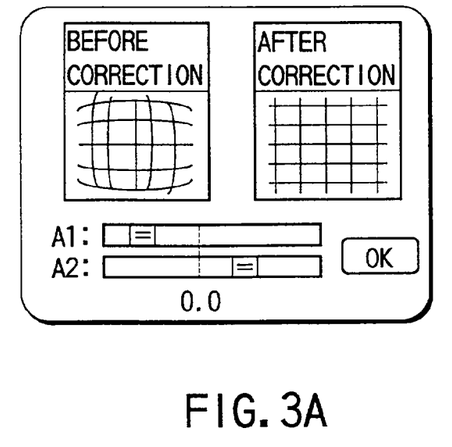
FIG. 3A is a view showing a view showing instruction of processing to an image displayed on an image display section, and a correcting state of the image.

The user operates the correction parameter setting section 43 as viewing at least one of two images. Thereby, coefficients A1, A2, . . . , which are used for appropriately correcting the image, are determined. At this time, to make the user operates easily, the correction parameter setting section 43 is preferably structured such that an imaginary adjusting knob displayed on the display section 44 is operated by a mouse, and a keyboard as shown in FIG. 3A. If the coefficients (A1, A2 in FIGS. 3A, 3B) are changed by the operation of the knob, the "image after correction" on the screen is recorrected in accordance with the new coefficient value, so that the image is renewed. If two or more images are needed to be displayed on the display screen, an arbitrary number of images can be, of course, displayed.

Figure 4:
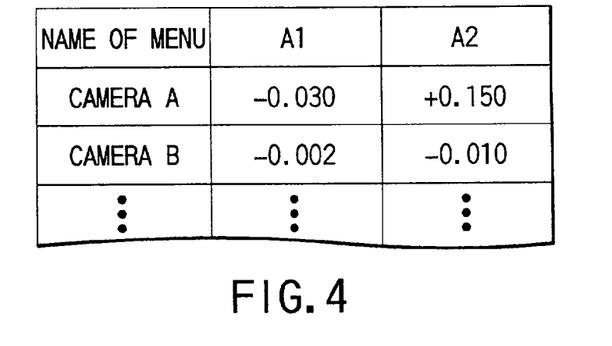
FIG. 4 is a view showing an example of a type of a file stored in a correction parameter storing section.

When the user judges that the correction is sufficient, he/she presses an "OK" key (clicks in the case of the mouse) to determine the coefficients A1, A2, . . . . . Thus, the determined coefficients are stored in the correction parameter storage section 42 together with names identifying cameras, which are arbitrarily added by the user. For example, they may be stored to the correction parameter storage section 42 as a file as shown in FIG. 4.

Arbitrary images can be used for adjustment of the coefficients. However, the image which includes abject with straight lines such as a building, a book shelf, a window frame, and graph paper, can be easily adjusted.

Next, the following will explain for the case of correcting images by the camera in which its images has been already corrected in the past and the coefficients A1, A2, . . . by that time are stored in the parameter storage section 42 as a file.

Figure 3B:
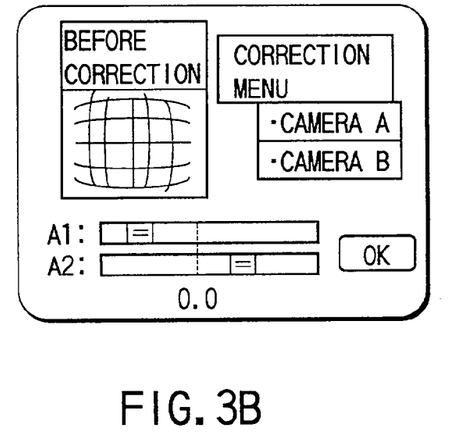
FIG. 3B is a view showing instruction of processing to the image displayed on the image display section, and a correction menu.

In this case, since the correction parameters are stored with names of photographing equipments, those data is read when the image processing device is started, and displayed on the image display section 44 in a menu form as shown in FIG. 3B. If the user selects the name of the device to be used from the menu screen, the corresponding coefficients A1, A2, . . . are read out to the distortion correction processing section 41 from the correction parameter storage section 42 through the correction parameter setting section 43. Thereby, the image to which the distortion correction processing is provided is output from the distortion correction processing section 41.

As explained above, according to this embodiment, it is unnecessary to know distortion data of the optical system of photographing devices in advance. In other words, the user can determine the correction coefficients as viewing only the image itself. As a result, even in the case of the camera which is used for the first time, there is no need of knowing the characteristic of the optical system in advance.

Also, in the case of using the camera in which the photographed images were corrected in the past, the correction coefficients of distortion are recorded as data. As a result, the correction processing can be executed by only selecting data from the menu. Therefore, it is possible to avoid the complication of the operation in which the parameter must be set every time to correct the entire images used in the image synchronization.

In this embodiment, there was used the digital still camera in which the images are stored in the memory card. However, the present invention is not limited to the digital still camera. The image processing may be executed even by a device in which data is directly input to the image reproducing section. Moreover, the above embodiment explained the case in which the plurality of images was photographed by one input device. However, the images can be photographed by the structure using a plurality of input devices simultaneously. Furthermore, though this embodiment explained that the correction parameter setting section 43 was the imaginary adjusting knob on the image display section 44, another switch of a rotation type or a slide type may be used.

Moreover, this embodiment explained the structure in which the image was corrected as comparing the original image with the processing result. However, in the case of the image of the object which includes straight line structure such as a building, a book shelf, a window frame, etc., only the image after the correction processing is displayed on the image display section 44, and the lines are adjusted to be straight. Thereby, the coefficients A1, A2 can be determined.

The following will explain the image processing device of a second embodiment.

This embodiment, which is a modification of the first embodiment, will be explained with reference to FIGS. 5 to 8. In these figures, the same reference numerals are added to the same structural portions as FIGS. 1 and 2, and the explanation is omitted.

Figure 6:
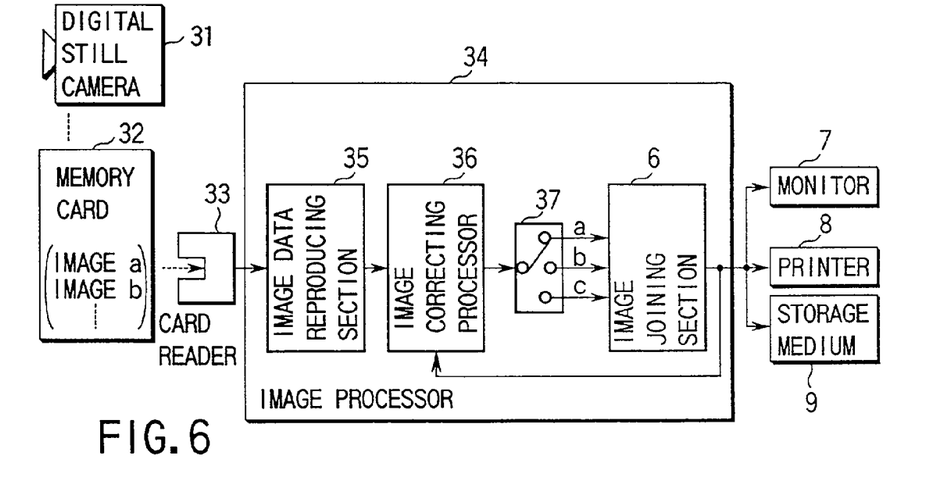
FIG. 6 is a showing a schematic structure of an image processing device according to a second embodiment of the present invention.
Figure 7:
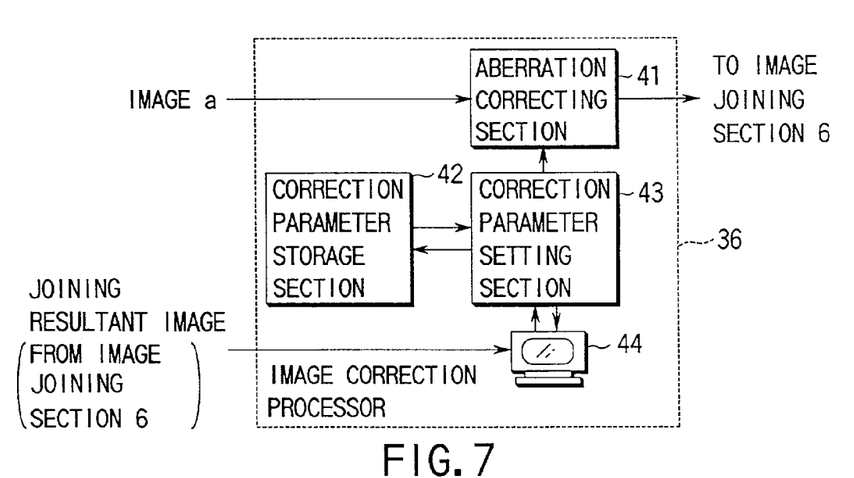
FIG. 7 is a view showing the structure of the image correction processing section of FIG. 6.
Figure 8:
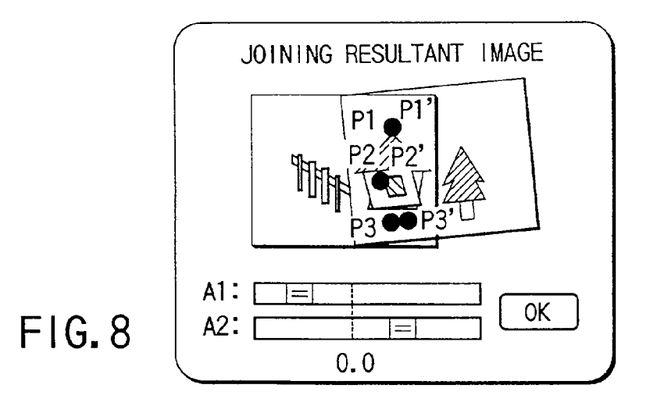
FIG. 8 is a view showing an example of a synchronizing result displayed on an image display section of the image correction processing section.

FIG. 6 is a view showing the structure of this embodiment. The second embodiment is different from the first embodiment in the point that the joined image output from the image joining section 6 is input to the image correction processing section 36. FIG. 7 shows the structure of the image correction processing section 36. FIG. 8 shows one example of the image displayed on the image display section 44 of the image correction processing section 36.

According to this structure, image data (image a) to which decompression is provided by the image data reproducing section 35 is input to the distortion correction processing section 41 so that data, which is corrected by correction parameter values A1, A2, . . . set in advance, is output to the image joining section 6. Similarly, the images, which are adjacent to the corrected image, are corrected by the distortion correction processing section to be output. The output images are joined by the image joining section 6, so that the joined image is generated. Then, the resultant image is input to the image correction processing section 36, and displayed by the image display section 44.

Figure 5A:
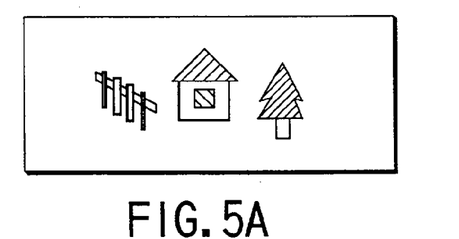
FIG. 5A is a view showing composition of an image to be photographed.
Figure 5B:
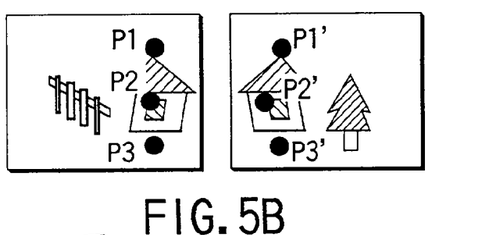
FIG. 5B is a view showing an example of the image photographed by an optical system having distortion.
Figure 5C:
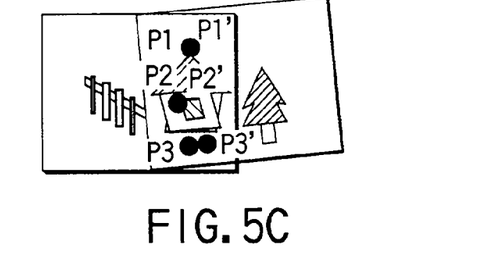
FIG. 5C is a view showing composition when joining the images photographed by the optical system having distortion.

Next, the following will explain an example of the actual processing by the user's operation with reference to FIGS. 5A, 5B, and 5C.

FIG. 5A is an object to be photographed. When composition of the object is divided and input through the optical system having distortion to have an overlap area where the same object as each other exists at a joining position as a plurality of image parts.

For example, a plurality of pairs of characteristic points (P1 and P1', P2 and P2', and P3 and P3' in FIG. 3B) are set on the image. This setting can be automatically executed by the image joining section 6 under control of a predetermined program. Or, this setting can be designated by the user's operation. Two points are selected from the pair of characteristic points. The following will explain the case in which P1 and P2 are selected.

At this time, it is assumed that an amount of parallel movement and an amount of rotation are obtained on the basis of P1 and P2 and the images are joined by the image joining section 6 as the distortion correction coefficients A1, A2, . . . are maintained incorrectly as they are. As a result, as shown in FIG. 5C, P1 and P1' are correctly conformed to each other. Also, P2 and P2' are correctly conformed to each other. However, P3 and P3' are not conformed to each other. Then, the other points of its surroundings are not conformed to each other.

At this time, the joined result is displayed on the image display section 44, and the user adjusts the coefficients A1, A2, . . . such that points other than reference points P1 and P2 are conformed to each other as viewing the display by the image processing device shown in FIG. 6. The adjusted coefficients A1, A2, . . . are immediately input to the distortion correction processing section 41. Then, the newly corrected images are joined to each other by the image joining section 6, and displayed on the image display section 44 again.

At this time, if the coefficients A1, A2, . . . are correctly set, not only P1 and P1', P2 and P2' but also P3 and P3' are conformed to each other, simultaneously. By this method, the image whose distortion is seemingly unclear such as a landscape image, and a figure image can be easily corrected.

In the above embodiment, the user adjusted the coefficients A1, A2, . . . as viewing the images displayed on the image display section 44. However, a shift between P3 and P3' is automatically detected, and the coefficients A1, A2, . . . may be automatically corrected such that the detected shift becomes 0 or minimum.

Figure 9:
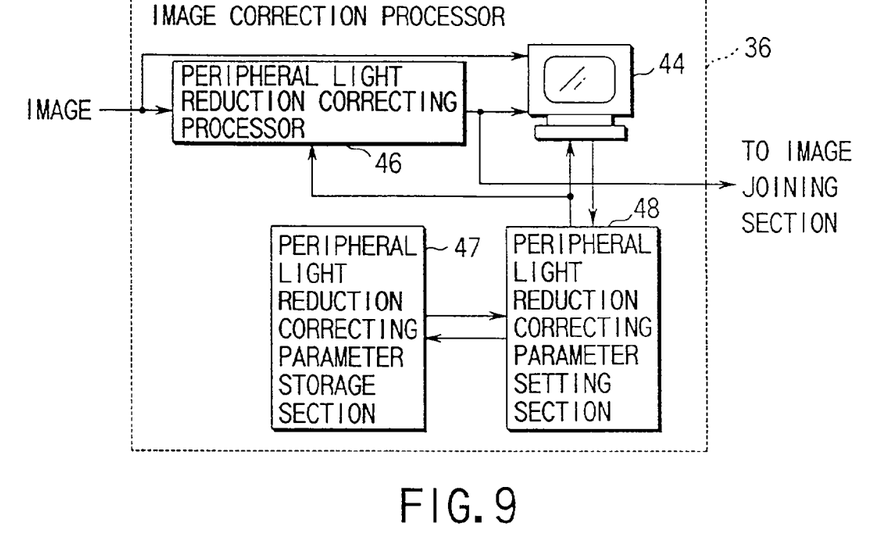
FIG. 9 is a view showing the structure of an image correction processing section in an image processing device according to a third embodiment of the present invention.

Next, FIG. 9 shows the structure of the image correction processing section of the image processing device of a third embodiment.

In these figures, the same reference numerals are added to the same structural portions as the first and second embodiments, and the explanation is omitted.

Generally, due to influence of peripheral reduction light in the optical system such as a camera, the brightness of the images is reduced as the image advances to the periphery. As a result, when the images with the peripheral reduction light are joined to each other, the image becomes dark at the overlapping area, and an unnatural joining image is generated.

Figure 10:
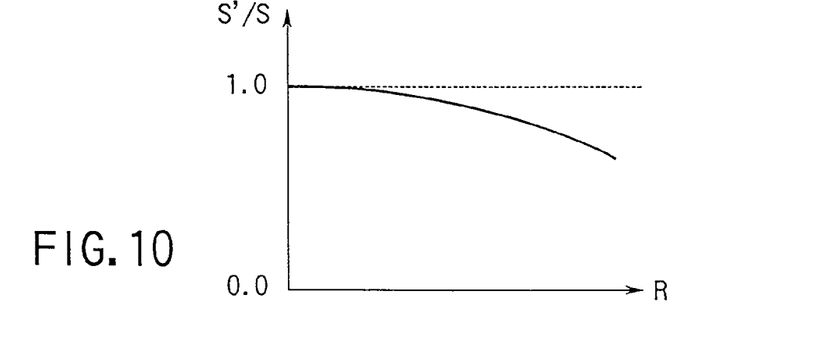
FIG. 10 is a view showing a relationship between a distance from the center of the image and a signal value in order to explain peripheral reduction light.

The peripheral reduction light is a phenomenon in which the brightness of the image becomes darker as a distance R from the center of the image is increased as shown in FIG. 10. A ratio of signal value S' to an ideal signal value with the peripheral reduction light can be approximately obtained by the following polynomial expression (3):

$$S'/S = B0 + B1 \cdot R + B2 \cdot R^2 + \quad (3)$$

In this case, the image correction processing section 36 comprises the image display section 44, a peripheral reduction light correction processing section 46, a peripheral reduction light correction parameter storage section 47, and a peripheral reduction light correction parameter setting selection section 48.

In the peripheral reduction light correction parameter setting selection section 48, an imaginary knob for displaying coefficients B0, B1, B2, . . . is moved to set such that brightness of the image center and that of the surroundings are the same.

If the coefficients B0, B1, B2, . . . are set by the above-mentioned structure, the image can be easily corrected based on the image itself even if the user does not know various parameters of the optical system of a camera. As a result, the images joined by the image joining section 6 does not become dark even at the overlapping portion, and a natural image can be obtained as an entire screen.

Same as the case of distortion, the marginal is the phenomenon peculiar to its optical system of the imaging apparatus. As explained in the first embodiment, the correcting coefficient values are once stored in accordance with names of photographing devices. Then, the images can be corrected by selecting the name from the menu at the second time and the following.

Moreover, this embodiment explained that the images were corrected as comparing the original image with the process result. However, since the brightness of the entire image may be uniformed, only the image after correction is displayed on the image display section 44, and the coefficients B0, B1, B2, 1 may be set and selected.

Figure 11:
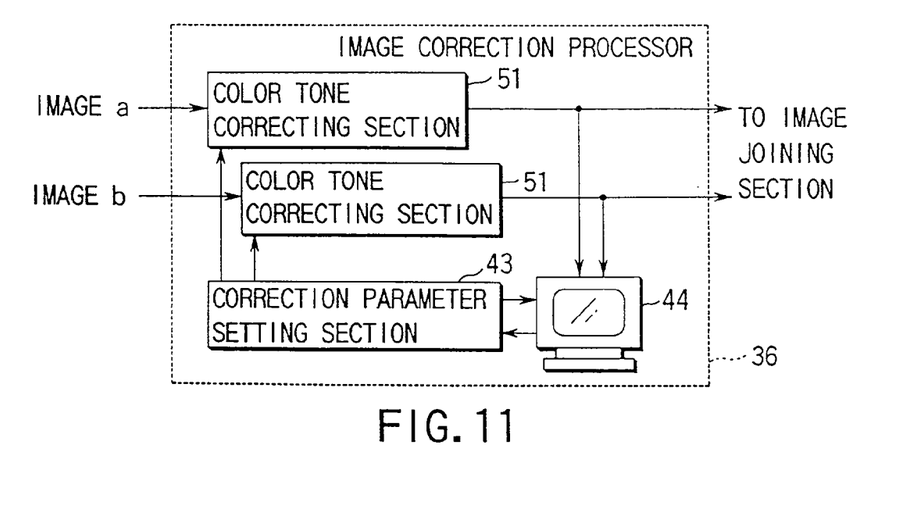
FIG. 11 is a view showing the structure of an image correction processing section in an image processing device according to a fourth embodiment of the present invention.
Figure 12:
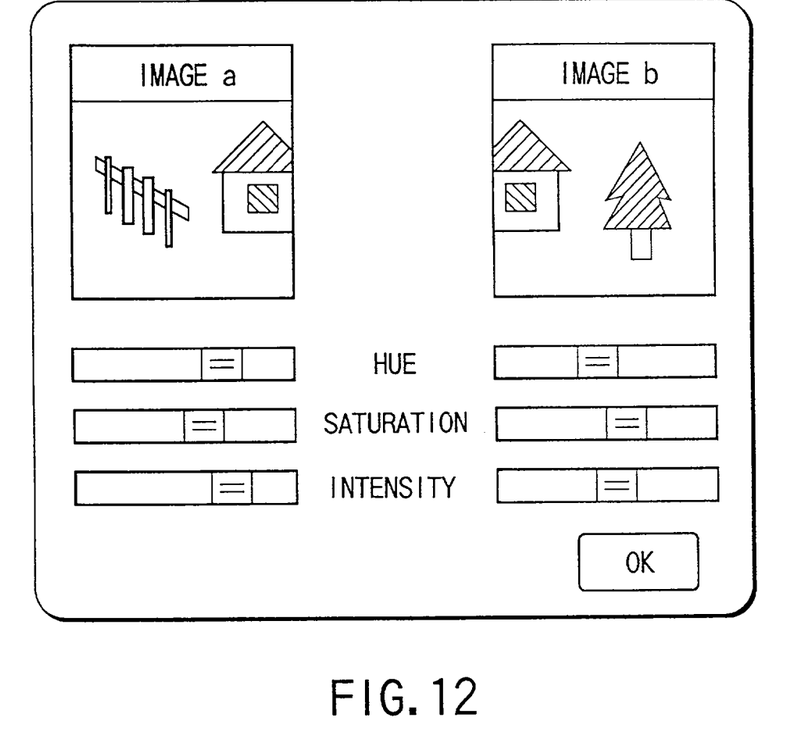
FIG. 12 is a view showing an example of display to correct color display on the image display section of the image correction processing section.

Next, the following will explain the structure for correcting a color tone by the image processing apparatus of a fourth embodiment of the present invention with reference to FIGS. 11 and 12.

The image processing correction processing section 36 in FIG. 11 comprises the image display section 44, a color tone correcting section 51, and the correction parameter setting section 43.

The color tone correcting section 51 converts the original image to hue (H), saturation (S), and intensity (I), respectively by HIS transformation. The correction parameter setting section 43 adjusts the correction parameter for transformation to H, S, I so as to correct the color tone.

The color correction section 51 corrects the input image based on hue H, saturation S, and intensity I to be output to the image display section 44. The user operates the knob for adjusting hue H, saturation S, and intensity I on the screen shown in FIG. 12 as comparing the images displayed on the image display section 44, in order that both images have the same color tone.

By the above-structured image correction processing device 36, not only the color tone of the overlapping area where the adjacent images are joined but also the color tone of the overall of the image can become natural. This embodiment explained that the original image was converted to hue (H), saturation (S), and intensity (I), respectively. However, similar to the adjustment of white balance, signal levels of R, G, B can be adjusted.

Figure 13:
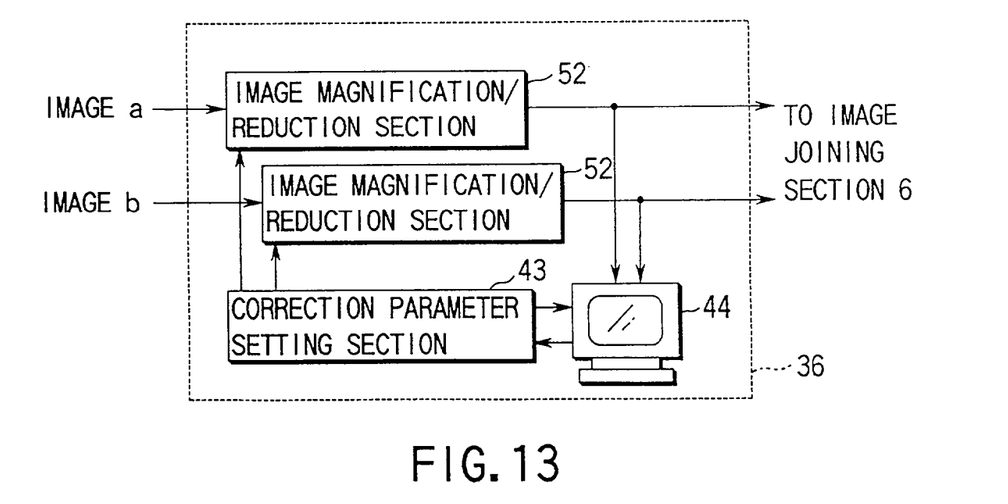
FIG. 13 is a view showing the structure of an image correction processing section having an image expansion/ reduction section and a correction parameter setting section.

Moreover, as shown in FIG. 13, an image magnification/reduction section 52 and the correction parameter setting selection section 43 are provided to the image correction processing section 36. Thereby, there can be obtained a well joined image in accordance with the difference in a zoom ratio, and the change of the object size due to the change of the photographer's position.

Next, the following will explain the structure to extend the dynamic range of the input image by the image processing apparatus of a fifth embodiment of the present invention with reference to FIGS. 14 to 17.

Figure 14:
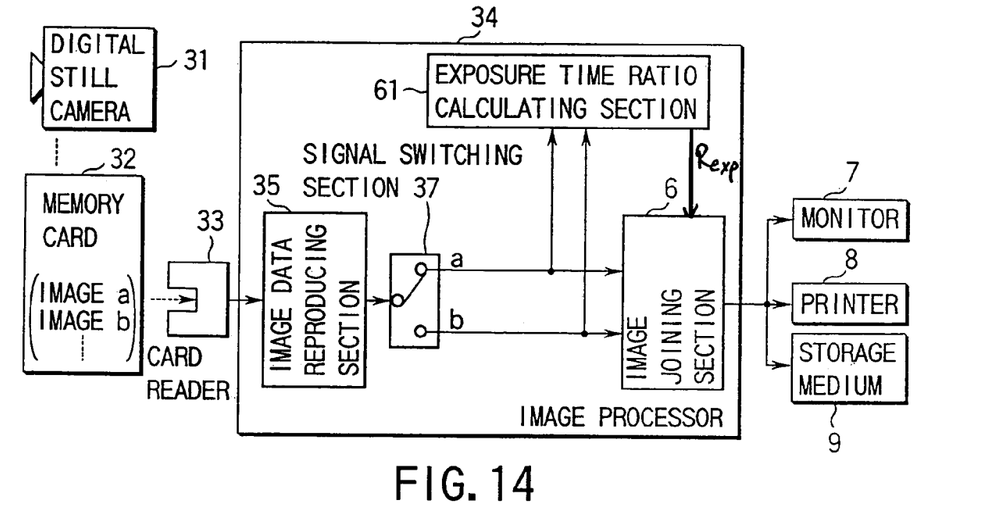
FIG. 14 is a view showing a schematic structure of an image processing device according to a fifth embodiment of the present invention.

The image processing apparatus of this embodiment calculates exposure ratio Rexp from the taken image, and synthesizes images with the calculated exposure time ratio. In these figures, the same reference numerals are added to the same structural portions as the first embodiment, and the explanation is omitted.

The image processing apparatus of this embodiment has the structure in which an exposure time ratio calculating section 61 is provided to the image processing section 34.

In the image processing section 34, reproduced images a and b are input to the exposure time ratio calculating section 61 through the signal switching section 37. As a result, an exposure time ratio Rexp is input to the image joining section 6. In the image joining section 6, the images a and b are synthesized with the calculated exposure time ratio Rexp, and the output image exceeds the dynamic range of the input device. Since the structure of the image joining section 6 uses the structure same as FIG. 22, the explanation is omitted.

Figure 15:
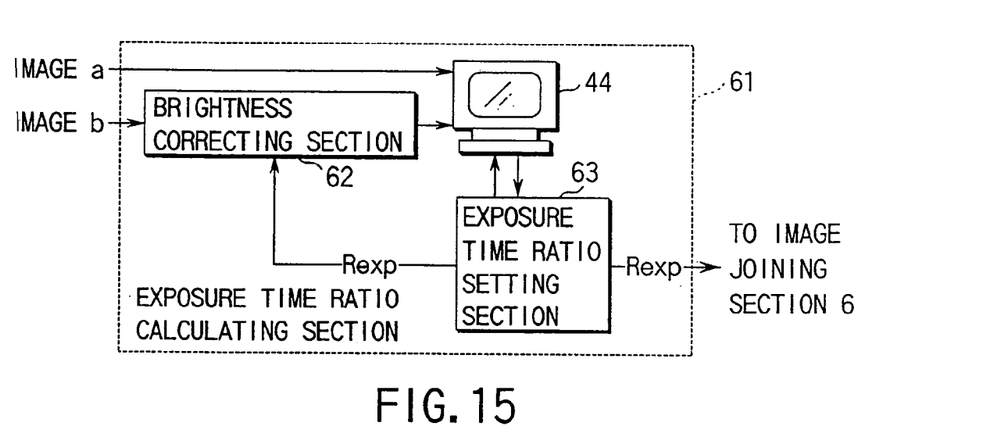
FIG. 15 is a view showing the structure of an exposure time ratio calculating section.

FIG. 15 explains the structure of the exposure time ratio calculating section 61.

The exposure time ratio calculating section 61 comprises the image display section 44, an exposure time ratio setting section 63 for adjusting the exposure time ratio Rexp by the user, and a brightness correcting section 62 for correcting brightness of the input image based on the exposure time ratio Rexp set by the exposure time ratio setting section 63.

Figure 16:
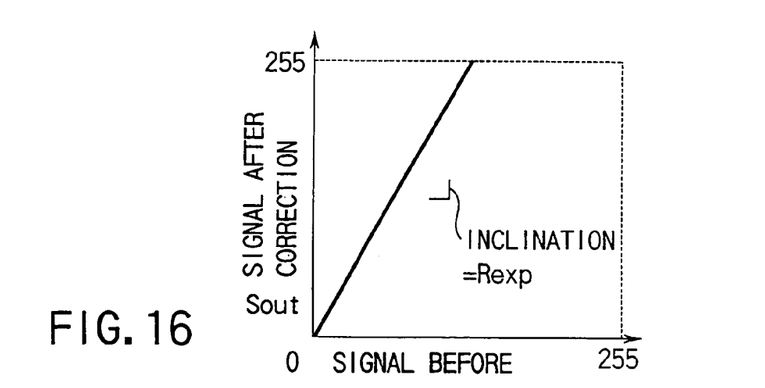
FIG. 16 is a view showing the relationship between an input image signal before correction and the signal after correction in a brightness correcting section.

FIG. 16 is a view showing the processing by the brightness correcting section 62. The signal Sout, which is obtained by correcting the image signal Sin, can be expressed by the following equation (4):

$$Sout = Rexp \cdot Sin \quad (4)$$

At this time, if Rexp>1.0, the image becomes brighten. If Rexp<1.0, the image becomes darker.

Figure 17:
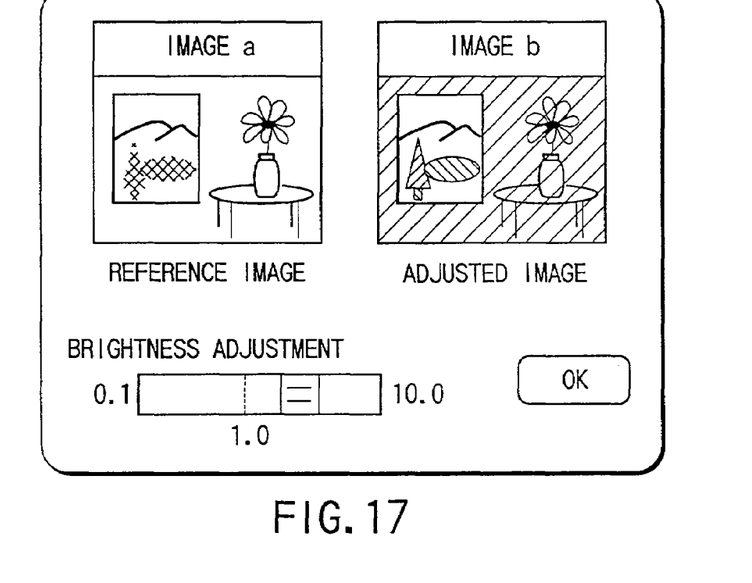
FIG. 17 is a view showing a display example on the display section of brightness correction.

FIG. 17 shows a display example on the display section.

In the image a, which is used as a reference image, the indoor portion where a table, a flower, etc are presented is captured at a suitable exposure. Then, the portion out of the window where woods and mountains can be seen is captured at an over-exposure. In the image b, which is used as an adjusting image, the portion out of the window is formed at the suitable exposure, and the indoor portion is formed at the under-exposure.

The image a is displayed as a reference image, and the knob displayed on the screen is adjusted to correct brightness of the image b. The user designates the end of adjustment with an "OK" key when the brightness of the entire image b reaches the same as the reference image (image a). The exposure time ratio Rexp set in this way is output to the image joining section 6, and the processing of the wide dynamic range is executed.

According to this embodiment, since the user can obtain exposure time ratio Rexp as confirming the image, a desired device can be used in the input device for inputting the image. Also, since it is unnecessary to record exposure time when taking images, the processing of the wide dynamic range can be easily executed.

Moreover, this embodiment explained the example in which the exposure time ratio between two images was used as a correction parameter. However, the present invention is not limited to the above example. The exposure time ratio among three or more images can be used as a correction parameter. The embodiment explained that one image was used as a reference image and the brightness of only the other image was corrected. However, brightness of both images can be corrected to generate an image having intermediate brightness. At this time, the exposure time ratio can be shown as in FIG. 16.

Moreover, as a method for photographing a plurality of brighter and darker images having a different exposure, the diaphragm of the camera can be changed, and the amount of incident light may be controlled by transmittance of the reduction light filter. In other words, as the correction parameter, which is necessary for the processing of the wide dynamic range, the parameter, which shows the exposure ratio among the plurality of images, may be used. For example, the exposure time ratio shown in the above embodiment, a diaphragm ratio, a transmittance ratio of the reduction light filter can be used as a correction parameter.

In the above-explained embodiments, the images are taken by the digital still camera. However, the same processing as in the embodiments can be executed even in the image, which is obtained by digitizing the film photographed by the conventional camera, or the image, which is input from the image photographed by the video camera or the digital video camera through an image input board. The monitor 7, which outputs the joined image, can be used as the image display device 44 of each embodiment.

Moreover, the above-explained embodiments can be combined with each other. Particularly, the correction parameter storage section 42 can be combined with the structure described in the first to third embodiments. In this case, the correction parameter storage section 42 can store the parameter if the user knows the characteristic of the optical system. Also, the correction parameter storage section 42 can be combined with the structure described in the fourth and fifth embodiments. In this case, the correction parameter storage section 42 can store the parameter to be used as a default value when the user executes the adjustment.

According to the present invention, there can be provided the image processing apparatus, which can correct only from the image photographed by a various imaging apparatus which the user has or the photographing device of a reasonable price, thereby obtaining the joined images with wide viewing angle and the image of the wide dynamic range. In this case, there is no need of knowing the characteristics of the distortion and peripheral reduction light optical system in advance. Moreover, there is no need of using the photographing device of a high price, which can control and record the photographing conditions such as exposure time, white balance, etc.

What is claimed is:

1. An image processing apparatus comprising:
   image input means for inputting a plurality of images of one composition which are picked up under different exposure conditions;
   correction parameter calculating means for determining correction parameters between the plurality of images based on the plurality of images input from the image input means;
   wherein the correction parameter calculating means comprises:
      image display means for displaying the plurality of images input from the image input means;
      correction parameter setting means for adjusting the correction parameters determined by the correction parameter calculating means, while differences in brightness between the plurality of images displayed by the image display means are being checked by a user; and
      brightness correcting means for correcting the brightness of at least one image in accordance with the correction parameters adjusted by the correction parameter setting means; and
   image synthesizing means for synthesizing the plurality of images including said at least one image, the brightness of which is corrected by the brightness correcting means.

2. The image processing apparatus according to claim 1, wherein the correction parameters determined by the correction parameter calculating means are exposure time ratios at which the plurality of images to be input by the image input means are picked up, respectively, and the correction parameter setting means has a function of displaying an imaginary adjustment knob on a display screen of the image display means such that each of the exposure time ratios is adjustable by a user.

3. The image processing apparatus according to claim 1, wherein the correction parameters determined by the correction parameter calculating means are aperture ratios at which the plurality of images to be input by the image input means are picked up, respectively, and the correction parameter setting means has a function of displaying an imaginary adjustment knob on a display screen of the image display means such that each of the aperture ratios is adjustable by a user.

4. An image processing method comprising:
   an image input step of inputting a plurality of images of one composition which are picked up under different exposure conditions;
   a correction parameter calculating step of determining correction parameters between the plurality of images based on the plurality of images input during the image input step;
   wherein the correction parameter calculating step comprises:
      an image display step of displaying the plurality of images input during the image input step;
      a correction parameter setting step of adjusting the correction parameters determined during the correction parameter calculating step, while differences in brightness between the plurality of images displayed during the image display step are being checked by a user;
      a brightness correcting step of correcting the brightness of at least one image in accordance with the correction parameters adjusted during the correction parameter setting step; and
   an image synthesizing step of synthesizing the plurality of images including said at least one image, the brightness of which is corrected during the brightness correcting step.

5. The image processing method according to claim 4, wherein said correction parameters determined during the correction parameter calculating step are exposure time ratios at which the plurality of images to be input during the image input step are picked up, respectively, and the correction parameter setting step displays an imaginary adjustment knob on a display screen such that each of the exposure time ratios is adjustable by a user.

6. The image processing method according to claim 4, wherein the correction parameters determined by the correction parameter calculating step are aperture ratios at which the plurality of images to be input during the image input step are picked up, respectively, and the correction parameter setting step has a function of displaying an imaginary adjustment knob on a display screen during the image display step such that each of the aperture ratios is adjustable by a user.

7. A recording medium recording a computer program for correcting a plurality of images obtained by taking one composition with different exposures, to provide an image having a desired brightness, said recording medium comprising:
   an image inputting program for inputting a plurality of images of one composition which are picked up under different exposure conditions;
   a correction parameter calculating program for determining correction parameters between the plurality of images based on the plurality of images input from the image inputting program;
   wherein the correction parameter calculating program comprises:
      an image display program for displaying the plurality of images input from the image inputting program;
      a correction parameter setting program for adjusting the correction parameters determined by the correction parameter calculating program, while differences in brightness between the plurality of images displayed by the image display program are being checked by a user;
      a brightness correcting program for correcting the brightness of at least one image in accordance with the correction parameters adjusted by the correction parameter setting program; and
      an image synthesizing program for synthesizing the plurality of images including said at least one image, the brightness of which is corrected by the brightness correcting program.

8. The recording medium according to claim 7, wherein said correction parameters determined by the correction parameter calculating program are exposure time ratios at which the plurality of images to be input by the image inputting program are picked up, respectively, and the correction parameter setting program has a function of displaying an imaginary adjustment knob on a display screen during the image display step such that each of the exposure time ratios is adjustable by a user.

9. The recording medium according to claim 7, wherein the correction parameters determined by the correction parameter calculating program are aperture ratios at which the plurality of images to be input by the image inputting program are picked up, respectively, and the correction parameter setting program has a function of displaying an imaginary adjustment knob on a display screen such that each of the aperture ratios is adjustable by a user.

10. An image processing apparatus comprising:
    an image input device which inputs a plurality of images of one composition which are picked up under different exposure conditions;
    a correction parameter calculator which determines correction parameters between the plurality of images based on the plurality of images input from the image input device;
    wherein the correction parameter calculator comprises:
       an image display device which displays the plurality of images input from the image input device;
       a correction parameter setting device which adjusts the correction parameters determined by the correction parameter calculator, while differences in brightness between the plurality of images displayed by the image display device are being checked by a user;
       a brightness corrector which corrects the brightness of at least one image in accordance with the correction parameters adjusted by the correction parameter setting device; and
       an image synthesizing device which synthesizes the plurality of images including said at least one image, the brightness of which is corrected by the brightness corrector.

11. The image processing apparatus according to claim 10, wherein the correction parameters determined by the correction parameter calculator are exposure time ratios at which the plurality of images to be input by the image input device are picked up, respectively, and the correction parameter setting device has a function of displaying an imaginary adjustment knob on a display screen of the image display device such that each of the exposure time ratios is adjustable by a user.

12. The image processing apparatus according to claim 10, wherein the correction parameters determined by the correction parameter calculator are aperture ratios at which the plurality of images to be input by the image input device are picked up, respectively, and the correction parameter setting device has a function of displaying an imaginary adjustment knob on a display screen of the image display device such that each of the aperture ratios is adjustable by a user.

* * * * *